United States Patent
Polzin et al.

[11] Patent Number: 5,339,484
[45] Date of Patent: Aug. 23, 1994

[54] CLOSED END PAINT ROLLER AND METHOD OF MANUFACTURE THEREOF

[75] Inventors: Bruce C. Polzin, Greendale; Kenneth L. Shehow, South Milwaukee; Fredrick B. Burns, Greendale, all of Wis.

[73] Assignee: EZ Paintr Corporation, Milwaukee, Wis.

[21] Appl. No.: 25,195

[22] Filed: Mar. 2, 1993

[51] Int. Cl.⁵ ............................................. B44D 3/28
[52] U.S. Cl. ................................. 15/230.11; 15/230.18
[58] Field of Search .......................... 15/230.11, 230.18

[56] References Cited

U.S. PATENT DOCUMENTS

| | | | |
|---|---|---|---|
| 2,959,800 | 11/1960 | Bischoff | 15/230.11 X |
| 3,394,423 | 7/1968 | Bischoff | 15/230.11 X |
| 3,886,621 | 6/1975 | Welsh | 15/230.11 |
| 5,090,084 | 2/1992 | DeGuzman | 15/230.11 |

FOREIGN PATENT DOCUMENTS

| | | | |
|---|---|---|---|
| 3616114 | 11/1987 | Fed. Rep. of Germany | 15/230.11 |
| 3903519 | 8/1990 | Fed. Rep. of Germany | 15/230.11 |
| 1059649 | 11/1953 | France | 15/230.11 |
| 64044 | 5/1955 | France | 15/230.11 |

*Primary Examiner*—Chris K. Moore
*Attorney, Agent, or Firm*—Baker & McKenzie

[57] ABSTRACT

A closed-end roller cover in which the pile fabric on the end, and the portion of the core to which it is secured, is integral with the main body of the cover, and a method of manufacture thereof. The cover is formed by heating the end portion of a fabric covered blank a short distance at the end, preferably along parallel lines so as to form structural lines of weakness, and immediately thereafter crimping the still pliable end portion inwardly upon itself to form a solid end wall with adhering pile fabric.

12 Claims, 2 Drawing Sheets

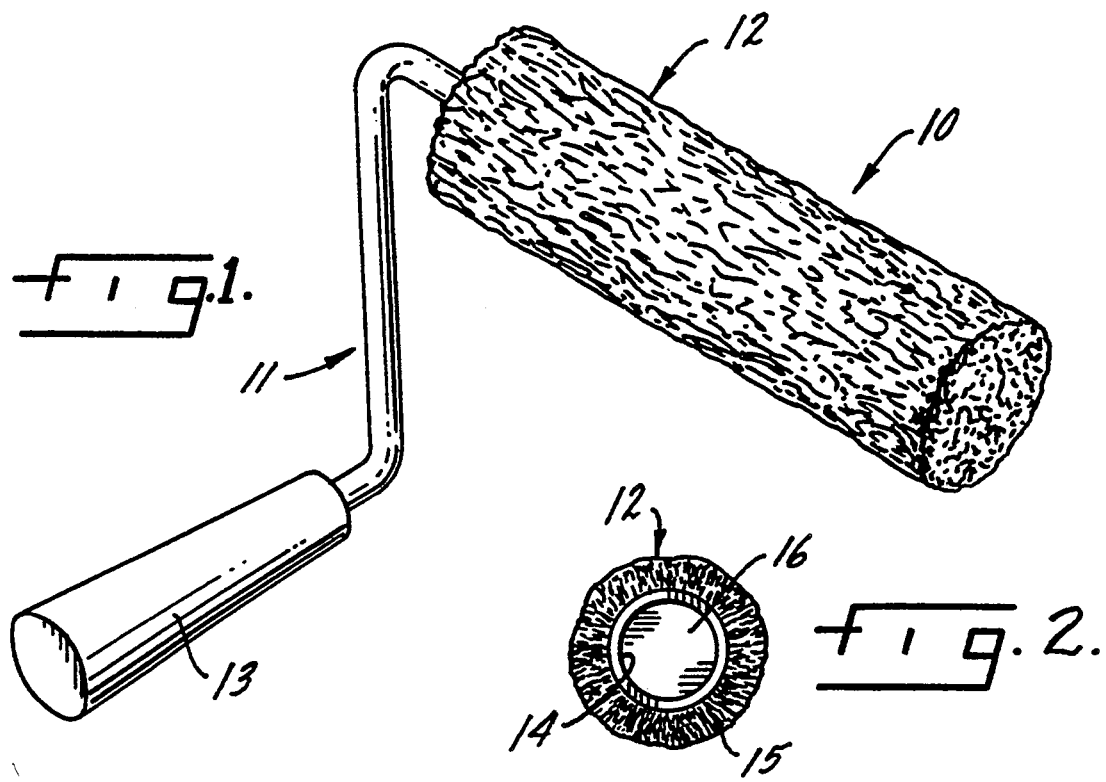
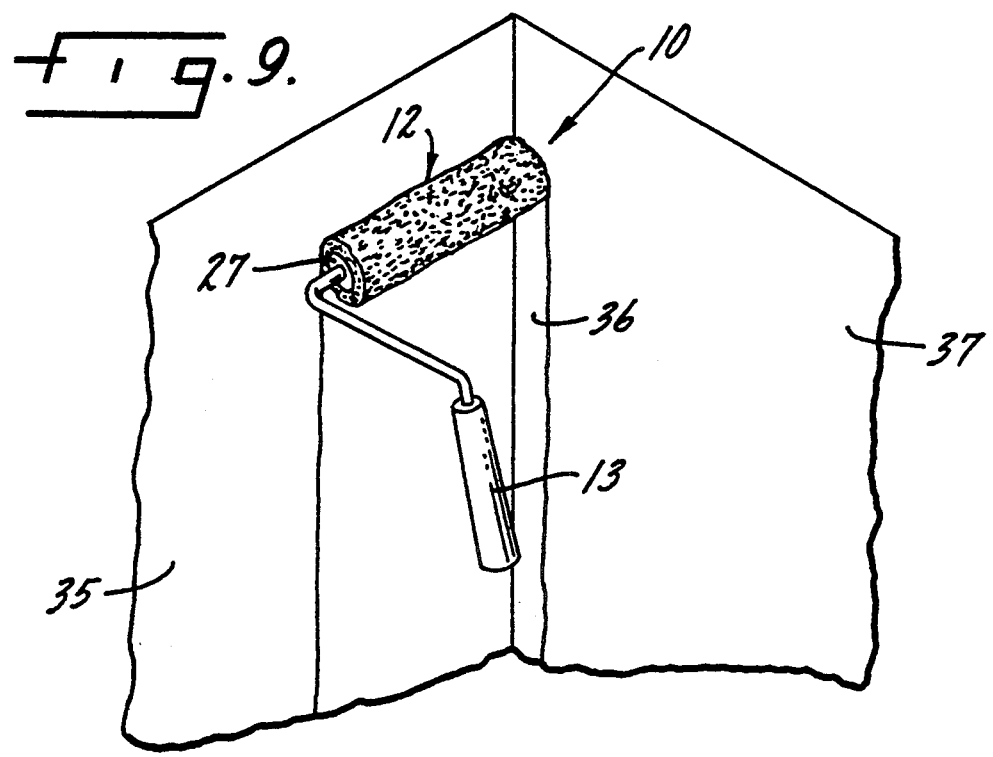

CLOSED END PAINT ROLLER AND METHOD OF MANUFACTURE THEREOF

This invention relates to paint applicators generally and specifically to a hollow thermoplastic core roller cover wherein one end is closed and rounded so that the same external covering material on the tubular outer surface of the core forms the exterior of the closed end, and a method of manufacture thereof.

BACKGROUND OF THE INVENTION

Paint roller covers of hollow, tubular core construction have long been used by professional and do-it-yourself painters to apply liquid coatings to walls and other surfaces. Typically, these covers consist of hollow, tubular core with a paint absorbent covering material, often a pile fabric, bonded to the outer surface of the core. These are designed with a tubular core so that a roller frame-handle unit of suitable design can fit inside and provide a complete paint roller applicator. Roller covers are then a replaceable element that may be easily changed without needing a new roller frame-handle unit. This permits the use of roller covers of different pile construction as desired, as well as placement for worn or soiled used covers. Virtually all paint roller applicators are commercially sold in this system; i.e.: durable roller frame-handle units, and a range of replaceable hollow, tubular core roller covers. The user selects the roller frame-handle and whichever replaceable roller covers that are desired for the projects intended.

These roller covers perform well except that they cannot paint corners. This task requires a supplementary applicator such as a brush, or a specially designed corner roller that can only paint corners.

A desirable improvement is a roller cover with one end closed and the same paint carrying covering on that end. Such design has been made commercially available in two forms.

One form has been to make a separate end plug having the paint carrying covering on the outer surface. This approach has not been widely accepted because of the costs of the special plug, the difficulty in having plugs with matching covering materials, and the complexity of fit-up and the marketing challenge of explaining the system.

A second form has proven more market acceptable, but is inherently costly to produce, does not seal the end and cannot be designed with a range of radiused configurations on the closed end. In this second form, a hollow core of thermoplastic material is covered with the paint carrying material which is suitably adhered. However, an extended length of the fabric is allowed to overhang the end of the core. In a separate operation this extended fabric is tucked into the end of the core and secured by adhesive or a plug. This does not seal the end, and the tucked fabric varies in occupied space.

SUMMARY OF THE INVENTION

The present invention is different from either of the above approaches, and is far more efficient to produce. In this concept a thermoplastic core cover is used. This cover has been produced by the efficient method of first making a long "stick" which is then cut down to numerous individual units, although this invention is not limited to this approach. One end of a tubular cover has a heated insert placed inside for a short distance, and for a short time. This heats the thermoplastic core to a pliable, compressible state without actually melting it. The heated insert is then removed and a radiused shallow cup or forming tool is then pressed against the end. This forms and shapes the end into the desired configuration.

It has been found through experimentation that proper time-temperature relationships are key to producing constant product of desirable shape. It has also been found that the closed end is more uniform when the end to be heated is scored in several equidistance lines around the internal core periphery.

In one example a roller cover of approximately 9/16-inch internal diameter with a polypropylene core and a pile fabric of ¼-inch pile height was used. It was scored in eight parallel lines from about ¼-inch depth inside one end of the core. A mechanics punch having nine sides at the striking end and being about ½-inch in diameter was heated over a gas burner to approximately 450° F. to 500° F. The heated insert was inserted about ¼-inch into the scored end of the core for about five to eight seconds and withdrawn. The end was then "folded" by pressing against a stationary surface and the inside was supported by another unheated punch.

BRIEF DESCRIPTION OF THE DRAWINGS

The invention is illustrated more or less diagrammatically in the accompanying drawing wherein:

FIG. 1 is a perspective view of a paint applicator which includes the novel closed end roller cover of this invention;

FIG. 2 is an end view showing the open end of the roller cover of this invention;

FIG. 9 is a perspective view of the paint applicator which includes the paint roller cover of this invention in use.

DESCRIPTION OF A SPECIFIC EMBODIMENT

Figure 3:
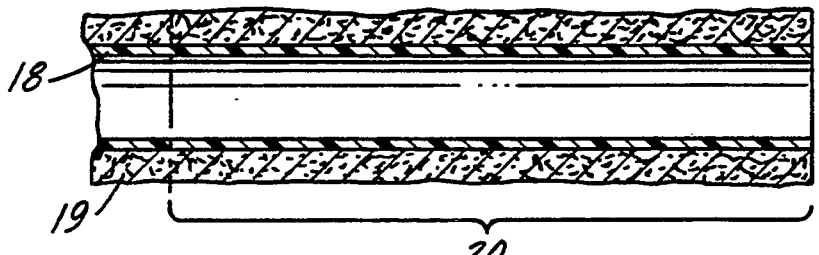
FIG. 3 is a longitudinal section through the end of a thermoplastic tube of any selected length to which a fabric cover has been adhered and represents an initial stage in the method of manufacturing the closed end roller cover of this invention.

Like reference numerals will be used to refer to like parts from Figure to Figure in the drawing.

Referring first to FIG. 1, a paint applicator is indicated generally at 10. The applicator includes a handle and roller assembly, indicated generally at 11, and the unique roller cover of this invention, indicated generally at 12. It will be understood that the handle assembly 11 usually includes a roller frame 27, see FIG. 9 at the end distal from handle grip 13, the roller frame being rotatable with respect to the grip 13 and the balance of the handle assembly, and onto which the roller cover 12 is placed and held, usually by frictional engagement of the hollow interior of the roller cover with the rotating roller frame.

From FIG. 2 it will be noted that the roller cover 12 includes a hollow, thermoplastic tubular core 14 to which a layer of a pile fabric 15 has been adhered by any suitable means. The inside of the closed end of the roller cover is indicated at 16.

The method of manufacturing the roller cover 12 and details of its construction will be apparent from an understanding of FIGS. 3–8.

Referring first to FIG. 3 a thermoplastic tube of any suitable length or diameter is indicated at 18 to which a layer of pile fabric 19 has been applied. It will be understood that the tube 18 and fabric 19 may be of indeterminate length, as would be the case if the tube and fabric were manufactured in a continuous process, or maybe of discrete lengths which would be the case if the length of the tube and fabric combination were a multiple of the blank length to be described hereinafter.

Figure 4:
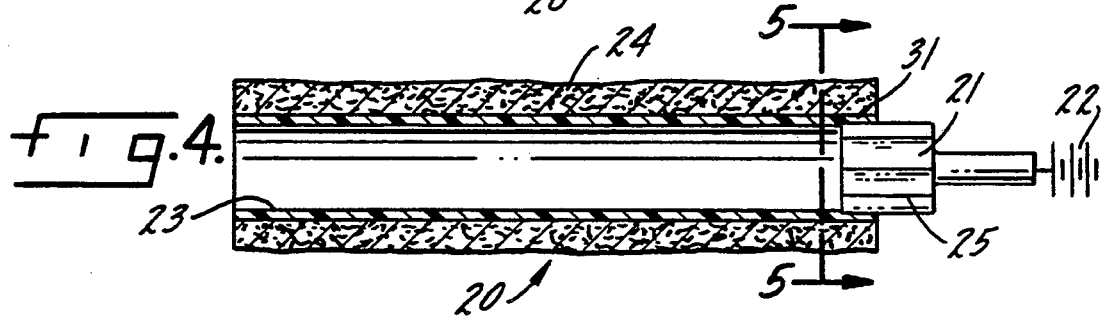
FIG. 4 is a section through a portion of the fabric covered tubular core which has been cut to a desired length to form a blank, one end of which is shown as undergoing a heat softening step in the manufacturing process.

Referring now to FIG. 4, a blank of a desired length of a fabric covered tube is indicated at 20, said blank, in an unseparated condition, also being illustrated in FIG. 3. A heated metal insert is indicated at 21, with heat being supplied to said insert from any suitable source 22. In one specific example using a polypropylene core 23 having approximately a 9/16-inch internal diameter and a pile fabric 24 height of about ¼-inch, the heated insert consisted of a mechanics punch which had been heated over a gas burner to approximately 450° F. to 500° F. and which was inserted about ¼-inch into the right end of core 23 for about five to eight seconds. The heated insert 21 may be fluted as illustrated in FIG. 5 so that each flute 25 of the insert makes tight fitting contact with the internal surface of core 23 so that, in effect, a number of lines of weakness corresponding to the number of flutes are established in the right ¼-inch of the core 23. An alternative configuration of the heated insert 21 is shown in FIG. 5A wherein the flutes of FIG. 5 are formed, instead, by the junction of eight flat sides 26 which form the periphery of the insert.

Figure 6:
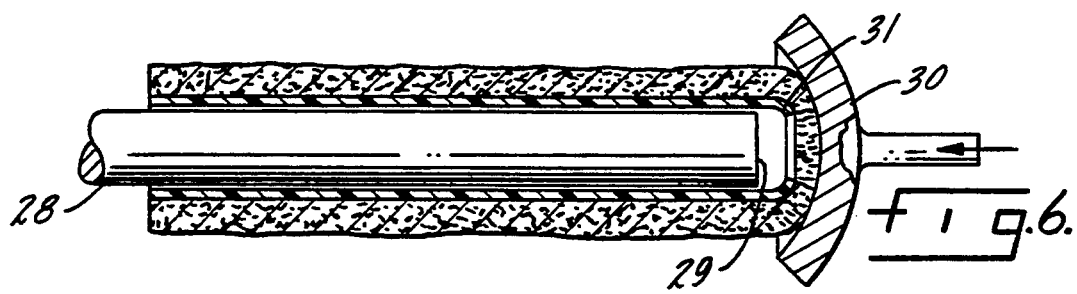
FIG. 6 is a view similar to FIG. 4 showing a subsequent step in the manufacturing process.

Immediately after removal of the heated insert 21 from the right end of blank 20, or before if desired, a backup rod 28 is inserted from the left end of the blank and positioned so that its right end 29 is located a short distance inwardly from the right end 34 of the blank. Nearly simultaneously with the withdrawal of the heated insert 21 and the positioning of the backup rod 28, a forming tool 30 is pressed against the heated end portion 31 of the core 23 as shown in FIG. 6.

Figure 7:
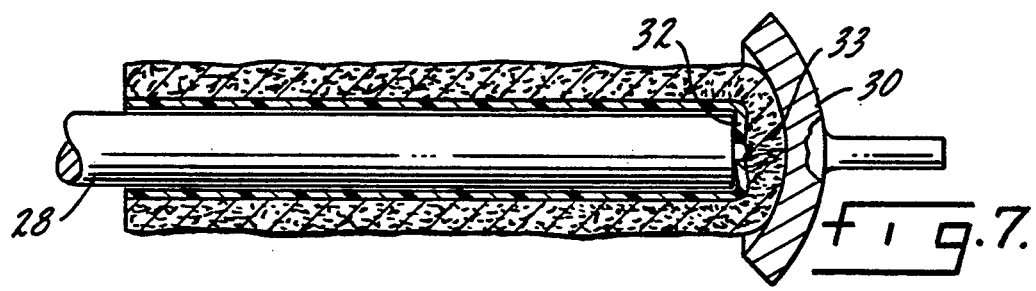
FIG. 7 is a view similar to FIG. 5 showing a subsequent step in the manufacturing process.

The heated portion 31 of the core will immediately begin to collapse under the pressure of forming tool 30 until the tool reaches its limit of travel illustrated in FIG. 7. In the FIG. 7 position the initially ring shaped heated portion 31 of the tube has been formed into a solid end wall 32 and the fabric on the exterior of the ring shaped heated portion 31 now forms a solid fabric surface. In some instances the wall 32 may not be totally solid, but any open area will be very small.

Figures 5A, 8:
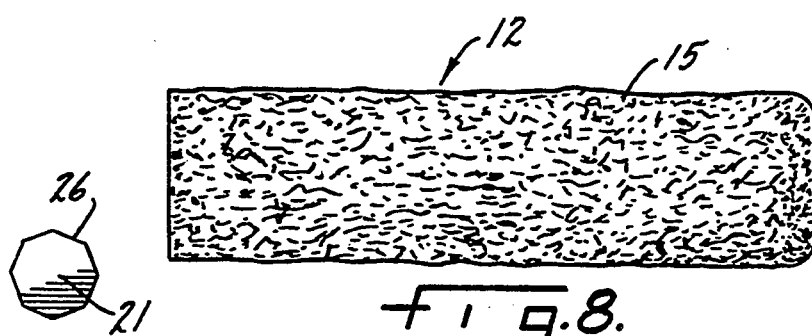
FIG. 5A is a view of the outline of another shape suitable for use in the heated insert.
FIG. 8 is a side elevation of the completed paint roller cover.
Figure 5:
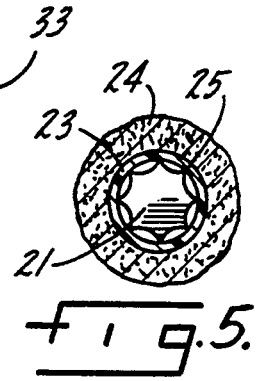
FIG. 5 is a section taken substantially along the line 5—5 of FIG. 4 illustrating particularly the contour of the heated insert used to form lines of weakness in the tubular core.

The backup rod 28 and the forming tool 30 are then withdrawn and the roller cover 12 then appears as shown in FIG. 8.

In operation a user loads the roller with paint in the usual manner and, in addition, ensures that paint is also loaded onto the solid fabric surface 33 at the closed end of the cover 12. As the paint applicator is rolled up a main wall 35, the solid fabric surface 33 will simultaneously paint a strip 36 on adjoining wall 37, all as best seen in FIG. 9.

Although a preferred embodiment of the invention has been illustrated and described, it will at once be apparent to those skilled in the art that variations and modifications may be made within the spirit and scope of the invention. Accordingly it is intended that the scope of the invention not be limited by the foregoing description but, rather, solely by the scope of the hereafter appended claims when interpreted in light of the relevant prior art.

We claim:

1. A paint roller cover for a paint roller frame, said paint roller cover comprising:

a unitary core having cylindrical configuration with a substantially closed end and an open end for fitting over the paint roller frame, the core also including an exterior roller surface and a longitudinal axis, a pile fabric secured thereto along the exterior roller surface of the core, and said pile fabric also being secured to the core at the substantially closed end of the core, the exterior surface of the substantially closed end of the core being disposed substantially perpendicularly to the longitudinal axis of the cover, the pile fabric at the end of the cover being integral with the pile fabric secured to the roller surface, the cover being removable from the paint roller frame.

2. The paint roller cover of claim 1 further characterized in that the core is a unitary semi-rigid structure having sufficient rigidity to maintain a cylindrical configuration of the roller during normal usage.

3. The paint roller cover of claim 2 further characterized in that the substantially closed end of the roller includes a semi-rigid base structure which is integrally formed with the core and to which the end pile fabric is secured.

4. The paint roller cover of claim 3 further characterized in that said semi-rigid base structure of the end of the cover completely closes the end of the longitudinal core.

5. A paint applicator comprising:

a paint roller cover, said paint roller cover including a unitary core having a substantially closed end and an open end for fitting over the paint roller frame, the core also including an exterior roller surface and a longitudinal axis, a pile fabric secured thereto along the exterior roller surface of the core, said pile fabric being disposed at the substantially closed end of the core, the exterior surface of the substantially closed end of the core being disposed substantially perpendicularly to a longitudinal axis of the cover, the pile fabric disposed at the end of the cover being integral with the pile fabric secured to the exterior roller surface and a handle assembly, said handle assembly including a rotatable frame, said paint roller cover being removably mounted on said rotatable frame.

6. The paint applicator of claim 5 further characterized in that the core is a unitary semi-rigid structure having sufficient rigidity to maintain a cylindrical configuration of the roller during normal usage.

7. The paint applicator of claim 6 further characterized in that the closed end of the roller includes a semi-rigid base structure which is integrally formed with the core and to which the end pile fabric is secured.

8. The paint applicator of claim 7 further characterized in that said semi-rigid base structure of the substantially closed end of the cover completely closes the end of the longitudinal core.

9. A method of manufacturing a paint roller cover comprising the steps of:

providing a length of a semi-rigid core to which a layer of pile fabric is secured, said length of core and layer of pile fabric having a open end portion, heating an interior surface of the core at the open end portion to a pliable state at a plurality of locations about an internal periphery of the core for a longitudinal distance on the order of about one half of an internal diameter of the core at the open end portion, folding the heated open end portion of the core while in a pliable condition radially inwardly to form an end wall structure which is disposed substantially perpendicularly to the longitudinal axis of the roller cover.

10. The method of manufacturing a paint roller of claim 9 further characterized in that the plurality of heated locations in the internal periphery of the semi-rigid core include a series of linear heated areas which are generally parallel to the longitudinal axis of the core.

11. The method of manufacturing a paint roller of claim 10 further characterized in that the plurality of heated locations are substantially equidistantly spaced.

12. The method of manufacturing a paint roller of claim 9 further characterized in that the end wall structure formed by the radially inwardly folded end portion of the core covers the entire open area of the end of the tube.

* * * * *